Aug. 26, 1969  H. NEWBOROUGH  3,463,089
HIGH-PRESSURE GEAR PUMPS
Filed Oct. 2, 1967  3 Sheets-Sheet 1
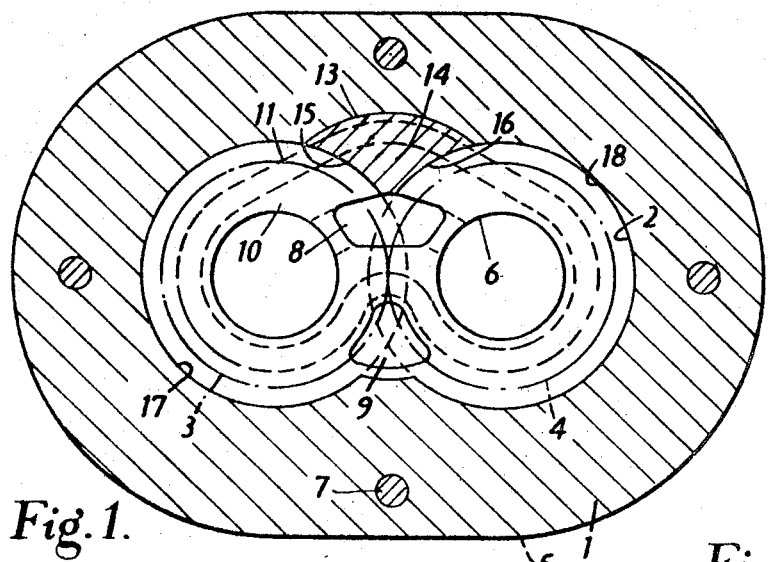
Fig.1.
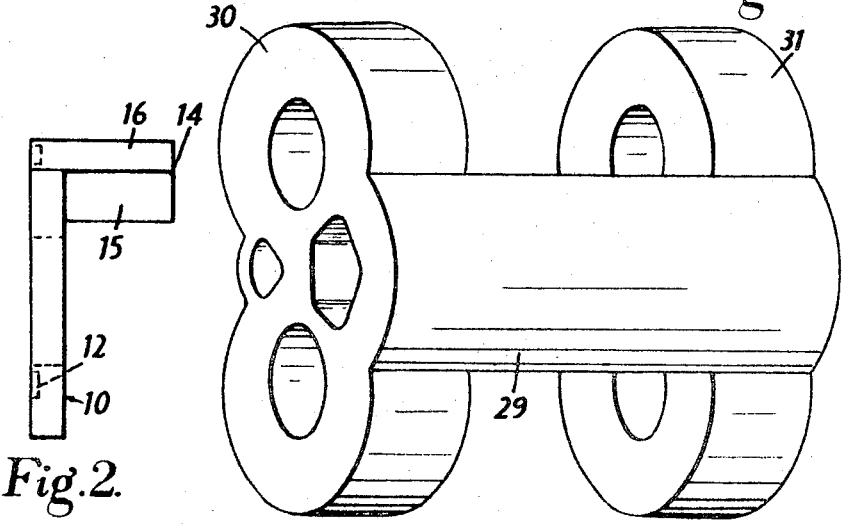
Fig.2.
Fig.4.

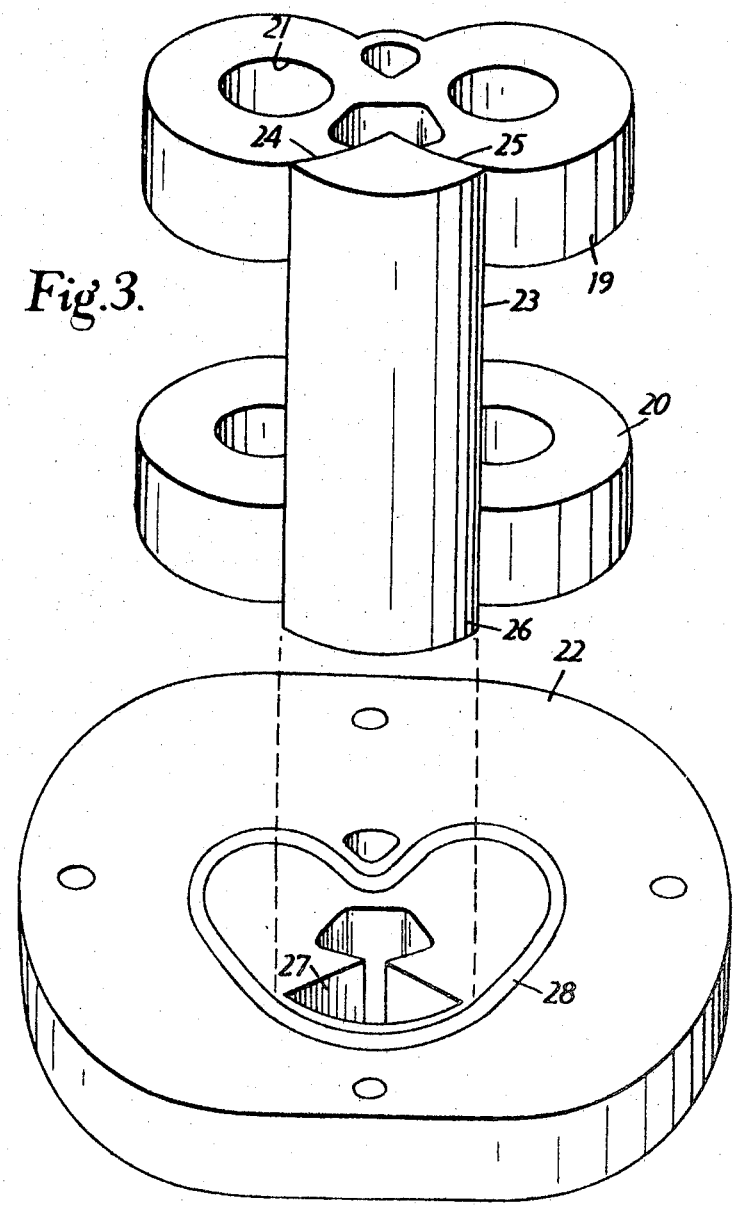

United States Patent Office 3,463,089
Patented Aug. 26, 1969

3,463,089
HIGH-PRESSURE GEAR PUMPS
Harry Newborough, Ilford, England, assignor to The Plessey Company Limited, Ilford, England, a British company
Filed Oct. 2, 1967, Ser. No. 672,308
Claims priority, application Great Britain, Oct. 7, 1966, 44,926/66
Int. Cl. F04 1/04; F04b 21/08
U.S. Cl. 103—126     6 Claims

ABSTRACT OF THE DISCLOSURE

In a gear pump for very high pressure the housing is made of high tensile-material, while a replaceable insert containing the surfaces which form the peripheral seal with the gears, consists of softer material having good tracking characteristics.

---

Figure 5:
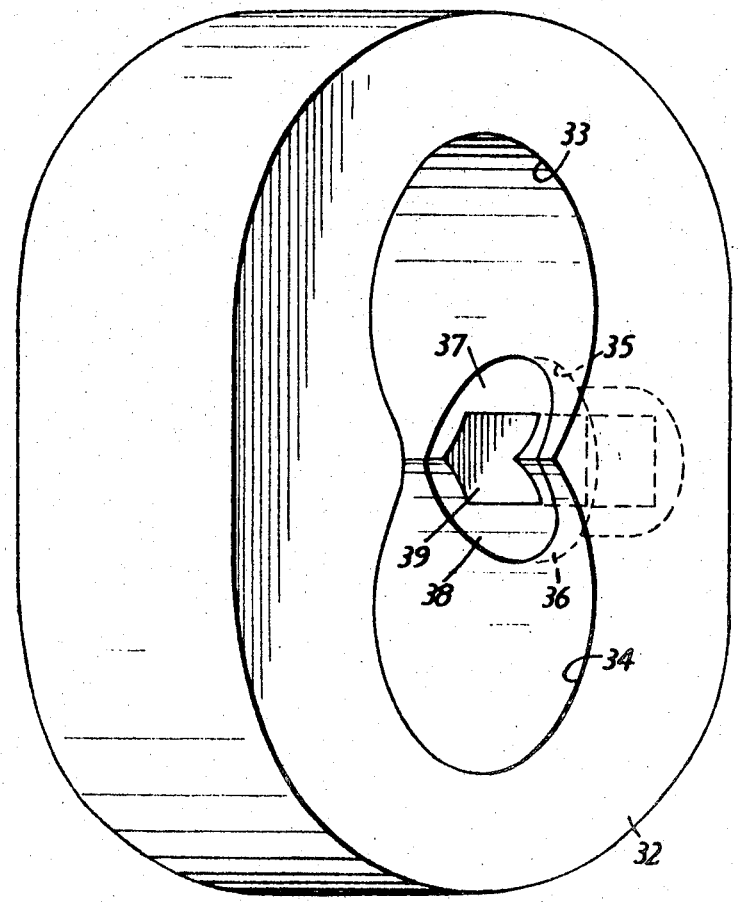

This invention relates to high-pressure gear pumps and has for an object to provide an improved high-pressure gear pump which can be made at an economic price and which will combine moderate dimensions with a high grade seal at the tooth tips of the gears. The term gear pump, unless the context otherwise requires, is used in this specification irrespective of whether the machine in question is used, or included for use, as a pump or as a motor.

In the manufacture of gear pumps it is known to produce a high-grade seal between the pumping gears and the pump housing by so assembling the gears with a housing of a material appreciably softer than that of the gears, for example with an aluminium-alloy housing in the case of steel gears, and to allow sufficient clearance in the bearings of the gears to allow the action of the pump-delivery pressure on the grater part of the circumference of each gear to move the gear into mechanical contact with the housing wall at the low-pressure side of the pumping chamber accommodating the gears, so that the gears will perform a machining function on these wall areas, the depth of penetration of the gears being limited by the supporting action of the bearings. This so-called tracking of the gears in the housing produces intimate sealing contact with the gears in an area adjacent to the low-pressure port, and the pumps having such seal will hereinafter be called of the kind specified.

It has been found that if delivery pressures exceeding, say, 3,000 lbs. per square inch are required in pumps of the kind specified, difficulties arise in the construction of the pump housing due to the low tensile strength of materials having good tracking qualities, the dimensions of the housing tending to become unwieldy. On the other hand, while a pressure-resisting housing could readily be made of materials of greater strength, such as castiron or steel, the very fact of the high tensile strength of these materials practically prevents the use of the above-described tracking operation and thus the achievement of optimum seal.

The present invention has for a more specific object to provide an improved housing which, while containing the internal pressure by the use of high-tensile material, nevertheless lends itself to the production of a high-grade seal by tracking of the gears, and which required only moderate machining accuracy. According to the invention a housing of a material chosen for its pressure-containing strength is provided with an insert, or set of inserts separate from the housing, which, for a small portion, preferably of the order of between not less than one tooth pitch and not more than two tooth pitches, of the circumference of each of the gears, forms localised parts of the peripheral wall of the pumping chamber which co-operate with the circumference of the pumping gears in a zone located at the low-pressure side of the zone of intermesh of the gears to isolate a low-pressure port from pump-delivery pressure, the insert being fixedly supported in the pump housing against movement transverse to the gear axes. The gears can thus perform the tracking operation on the insert in the same manner in which in known constructions they perform the tracking operation on the housing wall of a soft-metal housing. Moreover, the insert portions, which are limited to a small part of the circumferential wall, can be made readily replaceable so that after prolonged use of the pump the quantity of its circumferential seal can be restored at a comparatively low cost, and since the circumference wall of the housing bore is clear throughout of the tooth tips, the requirements of boring accuracy are minimised.

Preferably a single insert is employed which contains the two segments respectively co-operating with the two gears, the remainder of the peripheral wall being preferably slightly set back from the circumference of the gears in order to limit the sealing contact as well as tracking operation to the part of the circumferential wall surface constituted by the insert.

The invention is applicable with particular advantage to pumps having movable side plates pressure-loaded at their outer side for sealing contact with the two end faces of the pumping gears. In this case the sealing insert is preferably made integral with a side plate, both in pumps in which the shafts of the gears extend with play through holes in the side plate and are supported in the housing body, and in pumps in which the gears are journalled in the side plates. In the latter case the bearing-support area may conveniently be spaced from the end faces of the gear to permit a certain amount of resilient movement of the gears relative to the insert due to the radial pressure action on the gears.

In a modified construction the insert is formed as a plug which is inserted in the circumferential wall of the pump housing, and which extends over a suitable sealing arc of each of the two pumping gears, the low-pressure port of the pump being formed as a passage extending longitudinally in this plug so that its open end facing the pumping gears is surrounded on all sides by the material of the plug.

The accompanying drawings illustrate four embodiments of the invention.

FIGURE 1 is a section at right-angles to the gear shafts of a pump housing according to one form of the invention, with gears indicated in chain-dotted lines, FIGURE 2 is a side elevation of a side plate employed in this embodiment, FIGURE 3 is an exploded perspective view showing an end plate, the two side plates, and the insert of another embodiment, FIGURE 4 shows, likewise in perspective view, an assembly of two side plates and an insert of yet another modification, while FIGURE 5 is a perspective view showing the central plate of a housing body having a bore filled with a modified form of insert.

Referring now first to FIGURES 1 and 2, the pump housing of the illustrated pump is assembled in sandwich manner of a central plate 1, which is formed with a cavity 2 constituting a pumping chamber in which the gears 3 and 4 are arranged in intermeshing relation, and two end plates 5 which have bearing bores 6 for the journals of the gears 3 and 4, the three plates having substantially equal outlines and being held together by bolts 7. At least one of the end plates 5 is further provided, facing the pumping chamber respectively at the two sides of the zone of intermesh of the gears, with a low-pressure port 8 constituting the inlet port in pump operation or the outlet port when the machine is used as a hydraulic motor, and a high-pressure port 9 constituting the outlet port in operation as a pump, a high-pressure zone communicating with the latter port being separated from a low-pressure zone communicating with the port 8 by the sealing action of the gear teeth on part of the circumferential wall of the pumping chamber 2 and by the seal between the end faces of the gears and the adjacent end faces of the pumping chamber.

In the illustrated embodiment, one of the latter end faces is constituted by a side plate 10 which is held in sealing contact with the adjacent end faces of the pumping gears by the admission of pump-delivery pressure from the high-pressure port 9 to part of the outer surface of the plate 10 while, in order to ensure alignment of the loading force thus produced with the hydraulic forces acting at the inner side of the side plate when the pump is in operation, a part of the outer surface of the plate 10, extending round the two bores 6 accommodating the pump journals, is isolated from this pressure-loaded area by an O-ring 11 which is held in position by a groove 12 formed in the outer face of the side plate 10 and/or the opposite face of the pump housing.

The pump as so far described is known and is similar, for example to those described in U.S. specification No. 2,816,510. In order now to enable the housing plates 1 and 5 to be made of cast iron, steel or other material of high tensile qualities which is not itself suitable for the tracking operation above referred to, the central housing plate 1 is formed with a recess 13 enlarging the pumping cavity 2 in a zone located at that side of the zone of intermesh of the gears 3 and 4 at which the low-pressure inlet chamber 8 is provided, and this recess 13 is filled by a fillet or insert 14 in the approximate shape of a wedge-section prism two flanks 15 and 16 of which are arranged to extend into contact with the pumping gears 3 and 4 and are concavely curved to conform closely to their shape and thus to form an effective seal with the outer circumference of the pumping gears. The outer circumference 16 of the insert 14 is sealingly supported by the wall of the recess 13 in the central housing plate 1. The prism-shaped insert body 14 and the side plate 10, with which it forms an integral part, are made of an alloy having good tracking characteristics, for example one of a light alloy of the kind hitherto employed for the whole housing of pumps of the kind specified. Preferably the peripheral wall portions 17 and 18 of the pumping chamber 2 of the housing member between the insert 14 and the high-pressure port 19 are made with a diameter slightly larger than the outside diameter of the pumping gears so that the sealing contact of the outer circumferences of the pumping gears is confined to the surfaces 15 and 16 of the insert 14. This not only avoids any risk of damage to the pumping gears due to contact with the hard housing material but also reduces the machining accuracy required in the portions 17 and 18 of the housing member 1, and it ensures that the tooth gaps of the pumping gears are under uniform pressure, namely the pressure of delivery port 9, throughout the arc extending from the outer end of the surfaces 15 and 16 to the high-pressure port 9, thus ensuring stability of pressure-load conditions round the gears and countering the tendency of the resultant radial loading force to wander round the gears in accordance with the operating speed of the pump in a manner described in British specification No. 899,062 and the corresponding French specification No. 1,231,347.

FIGURE 3 illustrates a modified construction of pump, in which two side plates 19 and 20, one at each end face of the pumping gears (not shown), are utilised for supporting the pumping gear journals in bearing bores 21, and which employs an approximately prismatic insert 23 of a material suitable for tracking operation, whose concave faces 24 and 25 serve for respective sealing co-operation with the circumferences of the pumping gears. Since in this case the end plates of the pump housing, of which one is shown at 22, are not utilised for supporting the journals, the end plate 22 has no bores for the passage of the journals, while the opposite end plate, which is not shown, has only one clearance bore for the driving shaft of the pump. Since the side plates 19 and 20 must be free to move relative to each other in the axial direction of the pump in order to produce a sealing effect at the gear end faces, it is impracticable to make the insert 23 integral with both side plates 19 and 20. In the illustrated construction it is made separate from both plates 19 and 20; these plates have the same external shape as in the usual construction in which no insert is provided in the pump housing, part of their circumference being arranged to form sealing contact with the faces 24 and 25 of the insert 23, while an end portion 26 of the prismatic insert, beyond the outer surface of the side plate 20, is arranged to be accommodated in a correspondingly shaped recess 27 at the inner side of the housing end plate 22, whereby the insert is located in a predetermined position in the housing. O-ring seals, similar to that formed by the O-ring 11 in FIGURE 1, are provided at the outer surfaces of the side plates 19 and 20, but in this case the O-rings are held in position by grooves 28 formed in the housing end plates 22, while the outer surfaces of the side plates 19 and 20 are left smooth.

While in this embodiment the prism 23 is made separate from both end plates 19 and 20, FIGURE 4 shows a modified construction of the side plates and insert prism, in which a prism body 29, similar to the prism 23 of FIGURE 3, is made integral with one side plate 30 while co-operating with the other side plate 31 in a manner similar to that of the co-operation of prism 23 with both side plates 19 and 20 in the case of FIGURE 3.

FIGURE 5 illustrates another embodiment of the invention, which can be used irrespective of whether or not the pump is equipped with side plates for pressure-loaded sealing contact with the gear end faces. The central plate 32 of a sandwich type gear-pump housing forms the peripheral wall of a pumping chamber constituted by the two inter-penetrating cylindrical bores 33 and 34 which serve to accommodate the two intermeshing pumping gears, not shown. In order to permit the use of a tracking operation when the housing body 32 is made of high-tensile material or any material which is itself unsuitable for tracking co-operation with the gears, a stepped bore 35 is arranged to penetrate this peripheral wall at the low-pressure side of the pump housing, and a similarly stepped plug 36 of light aluminium alloy or other material suitable for tracking is inserted into this bore, the larger end surface of this plug 36 being formed by two intersecting cylinder surfaces 37 and 38 respectively coaxial with the cylindrical bores 33 and 34 but slightly proud of their surfaces so as to make contact with the tooth tips of the pumping gears. A low-pressure pump-inlet passage 39 extends throughout the length of the plug 36 and forms a port opening facing the gears, which is surrounded by parts of the surfaces 37 and 38 with which the gears will make sealing contact. It will be readily appreciated that, since part of each gear facing the passage 39 is under low pressure, the higher pressure on the remaining part of the circumferences of the two gears will urge the gears into contact with the surfaces 37 and 38 and will thus produce a tracking effect similar to that normally obtained in pumps of the kind specified.

What I claim is:

1. A high-pressure gear pump comprising a housing made of high-strength material and having a pumping chamber, a plurality of pumping gears mounted in the housing for mutual intermeshing rotation in the pumping chamber, the circumferential wall of the pumping chamber being clear of the gears, throughout its length, and at least one insert of a material suitable for tracking said at least one insert herein, mounted in said housing to extend from said circumferential wall into sealing engagement with said gears, over a small portion of the circumference of each gear to form a sealing zone situated at the low-pressure side of the zone of intermesh of said gear with another of the gears to isolate a low-pressure portion of the pumping chamber from pump-delivery pressure, said at least one insert being fixedly supported in the pump housing against movement transverse to the gear axes.

2. A pump as claimed in claim 1, wherein the sealing contact of the at least one insert with each gear extends over not less than one tooth pitch, and not more than twice the tooth pitch, of the gear.

3. A pump as claimed in claim 1, which includes a single pair of gears and a single insert which has two arcuate portions co-operating sealingly with the two gears respectively.

4. A pump as claimed in claim 1 and having at least one pressure-loaded side plate sealingly co-operating with the insert.

5. A pump as claimed in claim 4, wherein the insert is integral with a pressure-loaded side plate.

6. A pump as claimed in claim 3, wherein the insert is formed as a plug which extends through the circumferential wall of the pumping chamber, and which contains a passage extending longitudinally of the plug and constituting the low-pressure port of the pump said passage having an open end which faces the pumping gears and which is surrounded on all sides by the material of the plug.

References Cited

UNITED STATES PATENTS

| 2,146,395 | 2/1939 | Horton | 230—141 |
| 2,211,154 | 8/1940 | Oshei | 230—141 |
| 2,622,534 | 12/1952 | Johnson. | |
| 2,817,297 | 12/1957 | Mosbacher. | |

DONLEY J. STOCKING, Primary Examiner

WILBUR J. GOODLIN, Assistant Examiner

U.S. Cl. X.R.

103—216

UNITED STATES PATENT OFFICE
CERTIFICATE OF CORRECTION

Patent No. 3,463,089                               August 26, 196

Harry Newborough

It is certified that error appears in the above identified patent and that said Letters Patent are hereby corrected as shown below:

Column 4, line 73, "said" should read -- , said --; line 74, "herein," should read -- being --.

Signed and sealed this 15th day of December 1970.

(SEAL)
Attest:

Edward M. Fletcher, Jr.                      WILLIAM E. SCHUYLER, JR.
Attesting Officer                              Commissioner of Patents